United States Patent [19]
Barber, Jr.

[11] 4,106,483
[45] * Aug. 15, 1978

[54] SOLAR ENERGY COLLECTOR

[75] Inventor: Everett M. Barber, Jr., Guilford, Conn.

[73] Assignee: Sunworks, Inc., Guilford, Conn.

[*] Notice: The portion of the term of this patent subsequent to Sep. 14, 1993, has been disclaimed.

[21] Appl. No.: 718,453

[22] Filed: Aug. 30, 1976

Related U.S. Application Data

[63] Continuation-in-part of Ser. No. 453,353, Mar. 21, 1974, Pat. No. 3,980,071.

[51] Int. Cl.² ............................................. F24J 3/02
[52] U.S. Cl. ................................. 126/271; 237/1 A
[58] Field of Search ............... 126/270, 271; 237/1 A; 60/641

[56] References Cited

U.S. PATENT DOCUMENTS

| | | | |
|---|---|---|---|
| 2,030,350 | 2/1936 | Bremser | 126/271 |
| 2,595,905 | 5/1952 | Telkes | 126/270 |
| 3,980,071 | 9/1976 | Barber, Jr. | 126/271 |
| 4,015,583 | 4/1977 | Laing | 126/271 |
| 4,019,496 | 4/1977 | Cummings | 126/271 |

Primary Examiner—Kenneth W. Sprague
Assistant Examiner—James C. Yeung
Attorney, Agent, or Firm—DeLio and Montgomery

[57] ABSTRACT

A solar heat energy collector is disclosed which includes an absorber in a housing beneath a transparent cover member. A plurality of closely spaced essentially parallel vane-like members extend horizontally between the absorber and cover member to inhibit convection currents within the housing, and are angularly variable as a function of the elevation of the sun.

7 Claims, 11 Drawing Figures

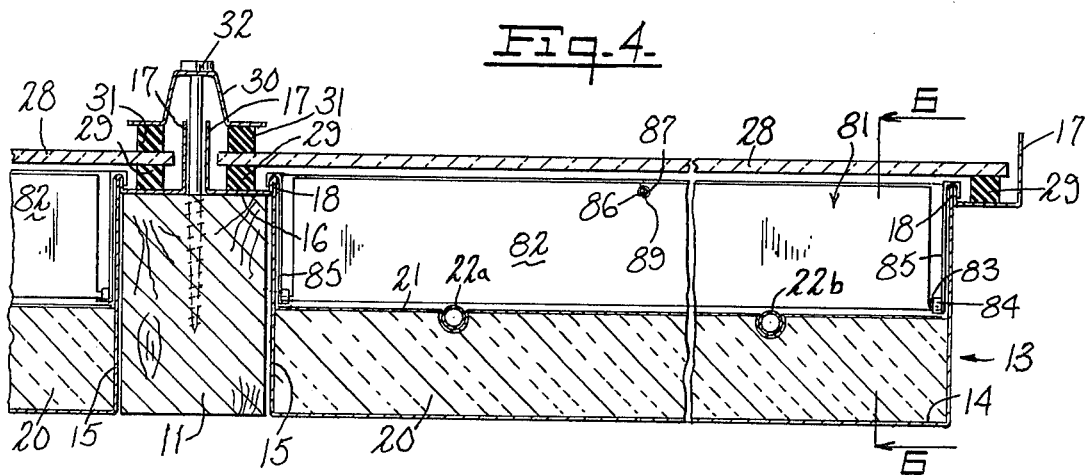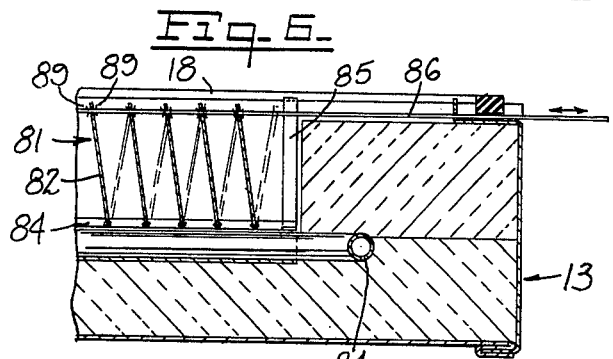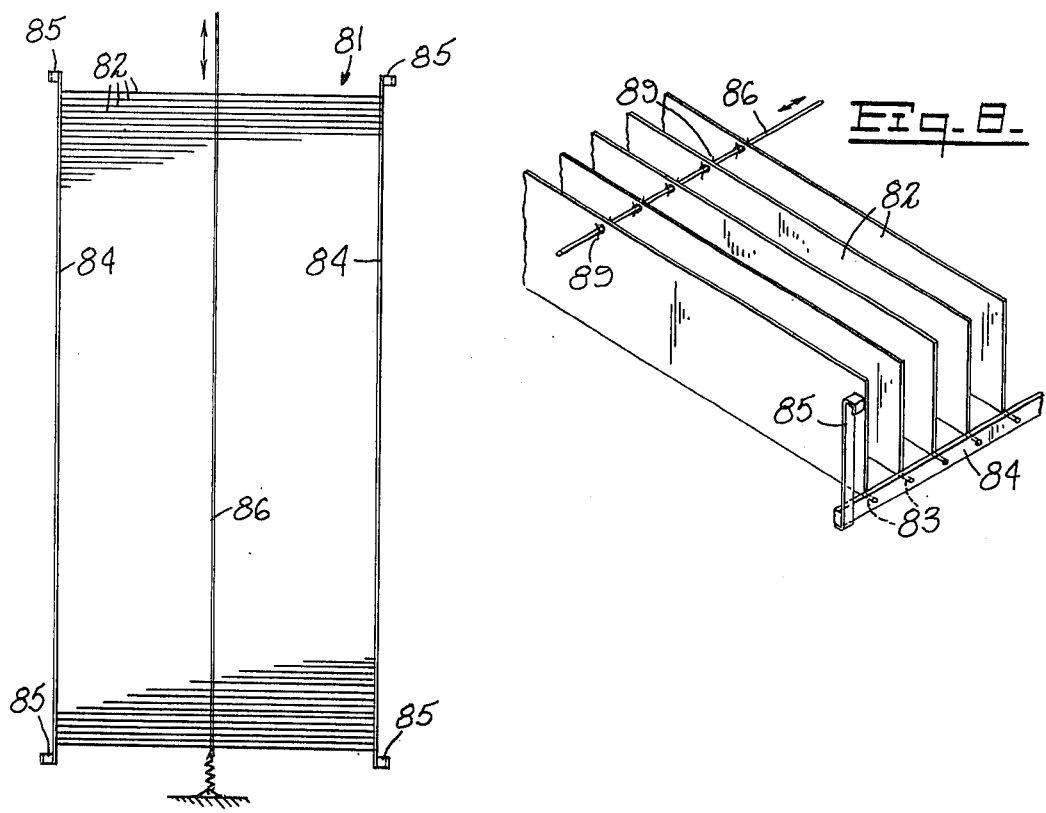

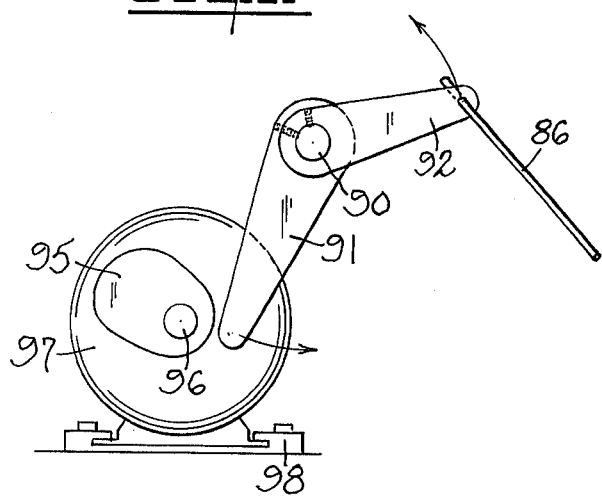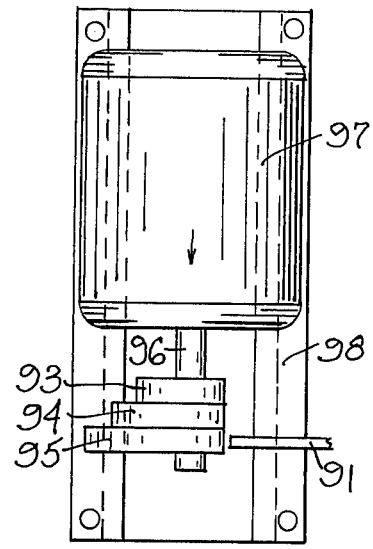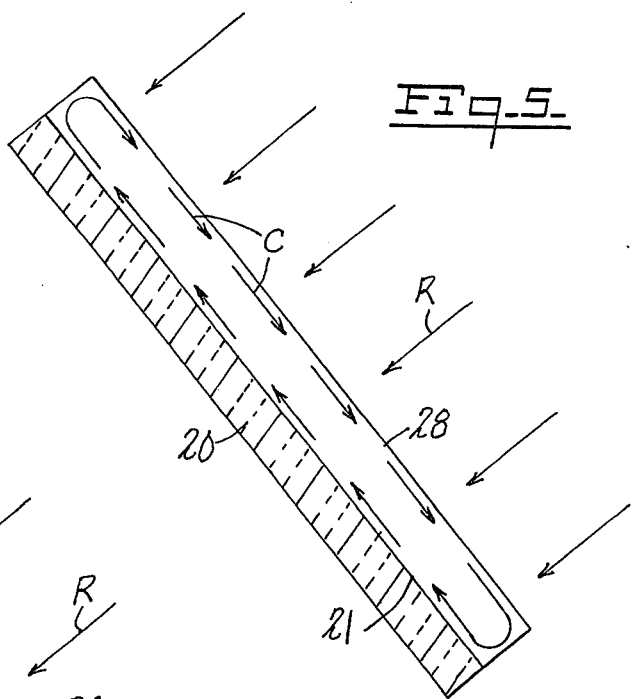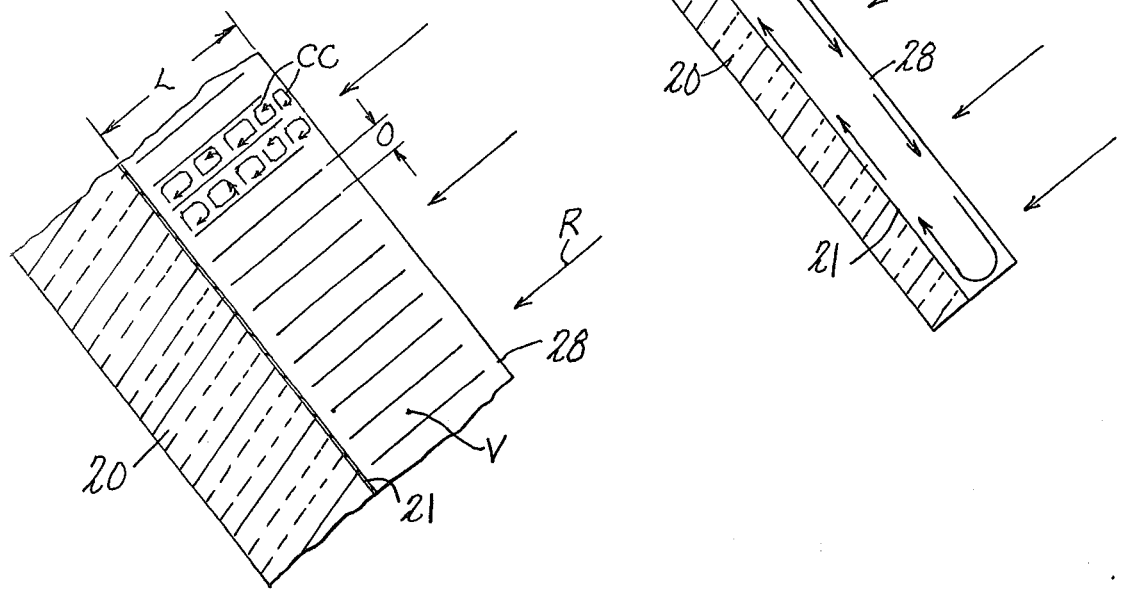

SOLAR ENERGY COLLECTOR

This application is a continuation-in-part of co-pending application Ser. No. 453,353, filed Mar. 21, 1974, now U.S. Pat. No. 3,980,071.

This invention relates to solar heat energy collectors.

The utilization of solar radiation to provide heat for a structure has long been proposed and is now coming into more common utilization. Basically, solar heating systems utilize a heat absorbing panel and a heat transfer medium which is moved in heat transfer relation with respect to the absorber. The transfer medium is utilized either for heating directly, or in another heat transfer arrangement where the transferred heat is then conducted for heating purposes. The heat exchange medium may be air or liquid.

Initial installation of solar heating systems at the present time are rather expensive as compared to the more conventional oil or gas fired heating systems or electrical heat. To attempt to become more competitive, the losses which may occur in a collector must be minimized to increase the thermal efficiency and reduce operating collectors.

Most collectors comprise a transparent cover member disposed and spaced from an absorber which is generally a panel or sheet in the collector housing. The collector housing is generally disposed at an angle to the vertical which is a function of the latitude of the installation site. Because of this semi-vertical disposition of the collector, convection currents tend to circulate over the absorbing surface of the absorber and then move past the transparent cover member. Such convection currents remove heat from the absorber and will then give up the heat to the transparent cover member which, in the case of glass, is a relatively poor insulator. This will substantially reduce thermal efficiency of the collector.

Accordingly, the present invention provides a new and improved collector structure which minimizes losses of the collector due to convection currents therein.

Briefly state, the invention in one form thereof as applied to a collector of the type described, comprises the provision of a plurality of substantially flat vane-like members which are essentially parallel to each other and act to inhibit convection currents within the collector which would otherwise remove heat from the absorber. The vanes are so arranged that the angle of the surfaces thereof with respect to the absorber may be varied as a function of the elevation of the sun.

An object of this invention is to provide new and improved solar energy collectors.

Another object of this invention is to provide a solar energy collector having new and improved means for reducing losses due to convection currents within the housing.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

FIG. 4 is a sectional view of a collector embodying the invention seen in the plane of lines 4—4 of FIG. 2;

FIG. 5 is a schematic representation of a collector;

FIG. 6 is a partial section of the device of FIG. 4 seen in the plane of lines 6—6 of FIG. 4;

FIG. 7 is a top plan view of a portion of the device of FIGS. 4 and 6;

FIG. 8 is a perspective view of a portion of the device of FIG. 7;

FIGS. 9 and 10 are views of devices for adjusting the elements of the mechanism of FIG. 4; and FIG. 11 is a schematic representation of a collector with the mechanism of FIGS. 4 and 6.

Figure 1:
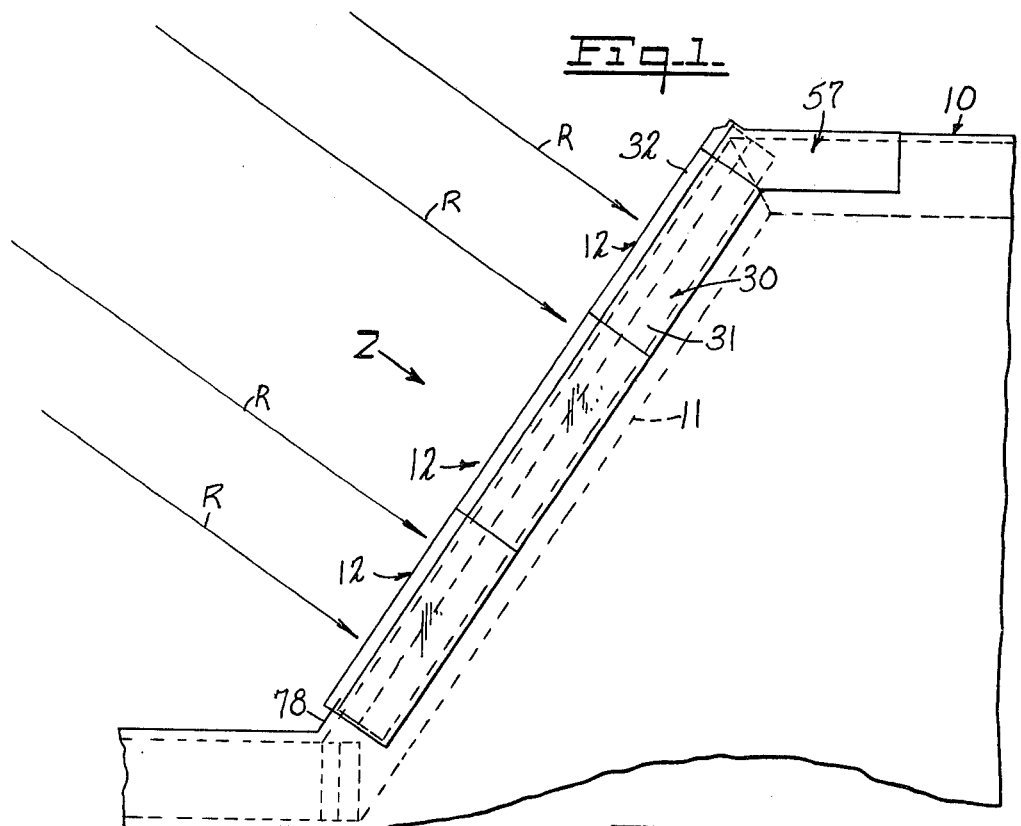
FIG. 1 is a side elevation of a structure to which solar energy collector is applied.
Figure 2:
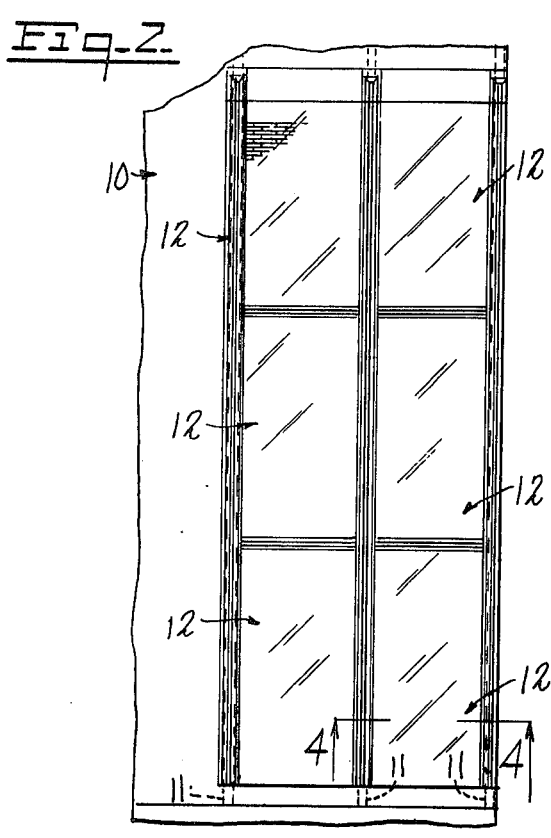
FIG. 2 is a view looking in the direction of arrow 2 of FIG. 1.
Figure 3:
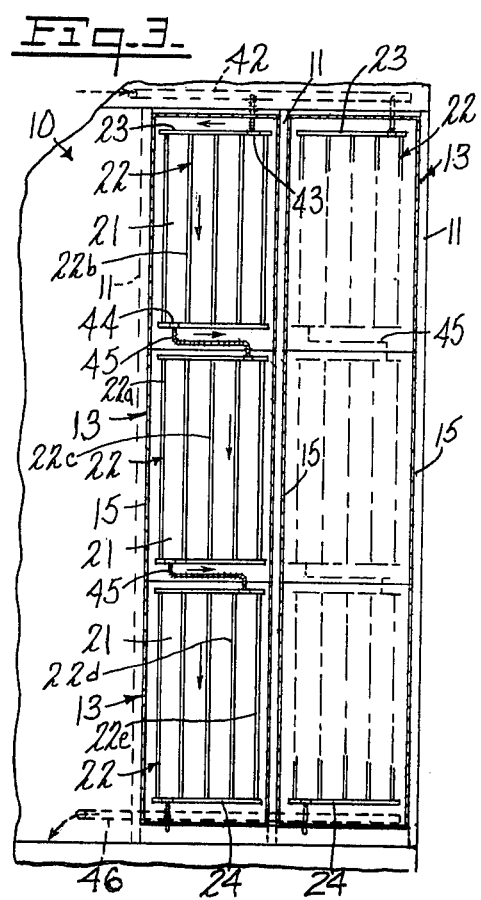
FIG. 3 is a view similar to FIG. 2 with the protective panels removed from the collectors.

A solar energy collector system as disclosed in co-pending application Ser. No. 453,353, now U.S. Pat. No. 3,980,071, is shown in FIGS. 1 - 3. A structure 10, such as a portion of a house as exemplified in FIG. 1, includes spaced apart rafters or joists 11. The joists 11 may be the roof or wall joists or rafters on a conventional structure. Spaced between the adjacent joists are a plurality of solar heat collectors 12. FIG. 2 exemplifies six such modules arranged in adjacent columns of three between three successive rafters. Each of the modules contains an absorber in the form of a panel, adapted to absorb solar heat energy represented by the arrows R. Each of the modules as shown in section in FIG. 4 includes a housing member 13 having a bottom pan portion 14, upstanding side wall members 15, extending into a flange 16 and an upright end portion 17. The housing may be so formed that an upstanding small rib 18 is defined on wall 15 and flange 16. Disposed within housing 14 along the bottom thereof is insulating material 20 such as a section of rigid fiber glass. Disposed above insulation 20 is a solar energy absorber panel. Each absorber includes a tubular heat exchanger 22 (FIG. 3). Disposed in intimate heat exchange relation with absorber 21 are a plurality of heat exchanger tubes 22a, 22b, 22c, 22d, and 22e which extend in substantially parallel spaced apart relationship between headers 23 and 24. As shown, absorber 21 is formed with troughs or wells which receive the heat exchange tubes and it will be understood that the tubes may be either downwardly or upwardly disposed with respect to the absorber.

The absorber 21 is preferably of copper or other heat conductive material and preferably has thereon a so-called selective surface which is designed to permit the absorption of solar radiation by the copper plate and decrease thermal radiation from the plate.

A transparent cover member 28 such as glass is supported above absorber 21. Member 28 rests on gaskets or seals 29 on flange 16. A border or frame of aluminum extrusion (not shown) may be provided on each cover member 28 for ease of handling and installation.

The collector shown in FIG. 4 is constructed so as to be supported directly on roof joists 11 through flanges 16. A cap and flashing member 30 compressively engages an exterior seal 31 above cover members 28. Cover members 28 are effectively sandwiched between exterior seal 31 and interior seal 29. The cap and collectors may be secured to the structure by lag screws 32.

A schematic representation of a collector of the structure thus far described is shown in FIG. 5. Due to the angle of the collector, and a large temperature differential between the cover member 28 and the absorber 21, a large convection cell is formed within the collector as indicated by the arrows C. Such convection currents carry heat energy from the absorber to cover member 28. Heat is lost from the absorber and is not available for transfer to the conduits 22. If a large space exists for air to move within the collector, a large single convection cell develops to take up the entire space.

In accordance with the invention, means are provided to inhibit the convection and increase the thermal efficiency of the collector.

A convection inhibiting mechanism 81 is disposed between absorber 21 and cover member 28. Mechanism 81 comprises a plurality of vane or louver-like members 82.

The vanes extend essentially horizontal of the housing and have essentially parallel facing surfaces. The vanes are pivotally adjustable to present only the edges thereof to the solar radiation. Reflection of the rays R between the louvers is not desired.

Extensions 83 on vanes 82 act as pivot pins and extend into apertures in lower bar members 84 on either side of the assembly. Hangers 85 are provided at spaced apart points on the bars 84 to hang the assembly over the ribs 18. A shaft 86 extends through apertures 87 in each of the louvers 82 with a loose connection thereto to permit some motion therebetween. Small pins 89 or other similar devices are mounted to shaft 86 on either side of the apertures 87 of the louvers. The shaft 86 may be moved in either direction to change the angle of the louvers with respect to the plane of the absorber 21.

In this arrangement the angle of the louvers may be varied depending upon the angle of elevation of the sun in the sky through the various seasons, so that the solar energy R will be directly incident on plate 21 and substantially parallel to the louvers.

As shown, the louvers are closely spaced from the surface of plate 21 to eliminate any direct contact and possible heat transfer from the surface to the louvers, as well as interrupt convection currents. The louvers or vanes may be slightly bowed or otherwise formed, as venetian blinds, to increase the stiffness thereof, if made of very thin material.

The rods 86 of joined collectors may be connected so that the directors of all panel units of a column may be actuated simultaneously.

Means are further provided for varying the angle of the louvers as a function of time of day and the seasons of the year.

A shaft or rod 90 (FIG. 9) is pivotally mounted above the absorbers, and has a cam follower 91 thereon. Arms 92 on shaft 90 are connected to each of louver controls rods 86. Cams 93, 94 and 95 are mounted to the shaft 96 of a timing motor 97. Motor 97 is slidably positionable on a mounting member 98.

As cams 93 – 95 rotate, a selected one will pivot shaft 90 through cam follower 91. Arms 92 move shafts 86 of each module and position the louvers 82 substantially parallel to the incident radiant energy. This prevents absorption of energy by the louvers and provides for more efficient collection by the panels.

The cams 93, 94 and 95 are contoured and sized in accordance with the seasons, winter, spring, fall, and summer, respectively, to position the louvers in accordance with the elevation of the sun. The motor 97 together with its associated gearing, operates on a twenty-four hour cycle. Usually, the cycle is calibrated so that the louvers are perpendicular to the collector plate at night and then will be inclined to produce the most efficiency during the day as the louvers follow the change in elevation of the sun.

The summer cam 95 will position the louvers at greater angles to the collector plate during the summer because of the higher elevation of the sun. The winter cam provides the least angular inclination with respect to the plates and the spring and fall cam positions the louvers intermediate with respect to the other cams. This discussion presupposes that the collector plates are positioned at an angle of 45° to 60° to the vertical. if the absorbers were vertically disposed, the camming arrangement would be different. The camming arrangement will depend on the angle of the absorbers.

FIG. 11 schematically exemplifies the effect of the vanes. The vanes which are just out of contact with absorber 21 define a multiplicity of horizontally extending volumes V. Natural convection is gravity powered. Warmer less dense fluids tend to rise above cooler more dense fluids. The heating of the air close to the absorber decreases the density thereof. As the spacing between vanes is reduced, a single large convection cell therebetween is converted into smaller and smaller counter rotating cells CC between adjacent vanes. The counter rotation of the cells CC substantially reduces the thermal driving force between the absorber 21 and cover 28.

The most effective ratio of the dimension of the height L of the vanes and the spacing O therebetween is three or greater. The vanes should be spaced no more than one inch and preferably one-half to three-eighths. Such spacing, due to the boundary layer effect, retards the counter rotating cells, and substantially eliminates convection between the absorber and the cover. At a spacing of ⅜ inch the boundary layer effect eliminates convection.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments which do not depart from the spirit and scope of the invention.

What is claimed is:

1. A solar heat energy collector comprising a housing having a transparent cover member and an absorber having an inside surface spaced from said cover member, said housing adpated to be supported at an inclination to the vertical, a plurality of thin, vane-like members disposed over said absorbing surface below said cover to retard convection currents within said housing, said vane-like members having substantially parallel facing surfaces spaced apart from one another a distance substantially greater than their thicknesses to permit solar energy to pass therebetween and to impinge upon said absorber surface substantially undeviated, and means for varying the angular disposition of said vanes with respect to said absorber surface to maximize the solar energy incident upon said absorber surface throughout a day, the edges of said vane-like members proximate said absorber surface being just above but not in contact therewith, said vane-like members extending across said housing in a horizontal direction.

2. A device as defined in claim 1 wherein said vane-like members are pivotable about edges proximate said absorber surface.

3. A device as defined in claim 1 wherein said varying means varies the angle of said vane-like members in accordance with the angle of elevation of the sun.

4. A device as defined in claim 1 wherein said varying means changes the angular disposition a varying amount as a function of the seasons of the year.

5. A device as defined in claim 1 wherein adjacent vane-like members have a separation between facing surfaces of from three-eighths of an inch to one inch.

6. A device as defined in claim 5 wherein adjacent vanes are separated about three-eighths of an inch.

7. A device as defined in claim 1 wherein the ratio of the depth of said vane-like members to the spacing therebetween is three or greater.

* * * * *

UNITED STATES PATENT AND TRADEMARK OFFICE
CERTIFICATE OF CORRECTION

PATENT NO. : 4,106,483
DATED : August 15, 1978
INVENTOR(S) : Everett M. Barber, Jr.

It is certified that error appears in the above—identified patent and that said Letters Patent are hereby corrected as shown below:

Column 1, line 67, before "solar" insert --a--.

Column 2, line 41, "exchanger" should read --exchange--.

Column 3, line 10, after "convection" insert --currents--.

Column 3, line 52, "controls" should read --control--.

Signed and Sealed this

Sixth Day of February 1979

[SEAL]

Attest:

RUTH C. MASON
Attesting Officer

DONALD W. BANNER
Commissioner of Patents and Trademarks